(12) United States Patent
Donaldson

(10) Patent No.: US 6,574,799 B2
(45) Date of Patent: Jun. 10, 2003

(54) ANTI-OSTEOARTHRITIS AND ANTI-HYPOTHERMIA GARMENT

(76) Inventor: Archie R. Donaldson, West Bay Street, P.O. Box N-4871, Nassau (BS)

(*) Notice: Subject to any disclaimer, the term of this patent is extended or adjusted under 35 U.S.C. 154(b) by 53 days.

(21) Appl. No.: 09/934,755

(22) Filed: Aug. 23, 2001

(65) Prior Publication Data

US 2003/0074709 A1 Apr. 24, 2003

(51) Int. Cl.[7] .............................................. A41D 13/00
(52) U.S. Cl. ................................. 2/16; 128/881; 602/63
(58) Field of Search .......................... 2/455, 456, 16, 2/59, 60, 61, 62, 465, 69, 22, 24, 2.15, 79, 458, 468, 44–45, 1, 87, 2.16, 93, 94, 97, 102, 108, 114, 159, 162, 239, 227, 311, 268, 910, 915, 917, 919, 125, 126, 170, 905, 906; 128/878, 881–882; 602/2–7, 20, 23, 25, 26, 27, 61, 63, 64, 65, 75, 76; 607/96, 108, 117; 219/527, 529, 211

(56) References Cited

U.S. PATENT DOCUMENTS

| | | |
|---|---|---|
| 1,329,025 A | 1/1920 | Smith |
| 1,602,454 A | 10/1926 | Riddell |
| 1,691,472 A | 11/1928 | Graham et al. |
| 2,494,987 A | 1/1950 | Chaitin |
| 2,831,198 A | 4/1958 | Datlof |
| 2,911,974 A | 11/1959 | Spence |
| 3,074,405 A | 1/1963 | Duensing |
| 3,322,118 A * | 5/1967 | Sotherlin ..................... 128/881 |
| 3,446,880 A | 5/1969 | Enicks |
| 3,710,395 A | 1/1973 | Spano et al. |
| 3,742,518 A | 7/1973 | Garcia |
| 3,829,901 A | 8/1974 | Massetti et al. |
| 3,895,638 A | 7/1975 | Ito |
| 4,042,803 A | 8/1977 | Bickford |
| 4,107,509 A | 8/1978 | Scher et al. |
| 4,229,833 A * | 10/1980 | Cox et al. ....................... 2/16 |
| 4,276,341 A | 6/1981 | Tanaka |
| 4,356,570 A * | 11/1982 | Vernon et al. ............... 2/126 |
| 4,832,010 A * | 5/1989 | Lerman ........................... 2/16 |
| 4,961,418 A * | 10/1990 | McLaurin-Smith ........... 2/164 |
| 4,985,934 A * | 1/1991 | Perry ............................. 2/125 |
| 5,035,001 A * | 7/1991 | Novick ........................ 2/102 |
| 5,622,762 A * | 4/1997 | Peria ............................. 2/15 |
| 5,638,546 A * | 6/1997 | Vita ................................ 2/16 |

* cited by examiner

Primary Examiner—Gloria M. Hale
Assistant Examiner—Tejash Patel
(74) Attorney, Agent, or Firm—Ditthavong & Carlson, P.C.

(57) ABSTRACT

A garment made from three layers of flexible material dimensioned to surround respective joints, body parts or the complete body, except for the entire face, of a wearer. The garment alleviates or reduces pain from certain forms of arthritis, especially osteoarthritis and can delay the onset of such conditions. The garment also can prevent hypothermia and reduce adverse effects from exposure to reduced temperatures.

3 Claims, 1 Drawing Sheet

ANTI-OSTEOARTHRITIS AND ANTI-HYPOTHERMIA GARMENT

BACKGROUND OF THE INVENTION

1. Field of the Invention

This invention relates to garments for delaying the onset of osteoarthritis and to provide relief for people having osteoarthritis by reducing the pain and swelling of the joints. This invention also relates to garments which can prevent or alleviate conditions caused by hypothermia of body parts.

2. Discussion of the Prior Art

Osteoarthritis is an inflammation of the joints due to infectious, metabolic, or constitutional causes which results in painful stiffness and swelling of the joints. Osteoarthritis is mainly a disease of "wear and tear". It is for this reason that a "cure" is very difficult to achieve because of the constant injury, however slight, which exceeds the normal repair process.

Healthy cartilage, the slippery tissue that covers the ends of the bones of a joint, allows bones to glide over one another and absorb the shock of physical movements. Over time, the cartilage deteriorates, allowing the bones to rub together, which can cause pain, swelling and loss of motion. Osteoarthritis may become even more widespread as the growing popularity of certain sports and stress exercises take place.

Most articulations are simple in structure. They are composed of two or more opposing, cartilage-covered bone ends, joined by a flexible tube of dense connective tissue, the articular capsule. An intimal layer of varying microscopic structure lines the capsule. This is referred to as the synovia or synovial membrane. This membrane, which heals much faster than the articular cartilage, requires about 90–100 days to repair after an injury. The very slow repair rate is the main drawback, in achieving a "cure" for osteoarthritis. Within this enclosed cleft is a small quantity of clear, viscid synovial fluid. The temperature of this fluid and surrounding parts may fall as much as 3–4 degrees Fahrenheit below the normal body temperature, when exposed to cold, due to the poor blood supply.

Adjacent to the joints are similar tissue components such as facial layers, tendons, tendon sheaths, and bursae. Not only are these structures of great importance in the normal mechanical functions of the joint but also in the majority of articular diseases they are either primarily or secondarily affected.

The hyaline cartilage covering the bone ends at the articulations is an elastic, avascular, and cell-poor tissue. Its chief, if not sole, source of nourishment is the synovial fluid contained within the articular cavity. Compared with other connective tissue articular cartilage has relatively little capacity for regeneration and repair following injury. Since articular cartilage is the recipient of most of the mechanical shocks and stresses that are exerted upon the skeleton, it is apparent that the maintenance of an entirely smooth articular surface, so essential to normal function, is constantly endangered. It has been clearly shown that articular cartilage is readily damaged by a wide variety of toxic agents, by acute injuries, and also by minor and repeated traumas that are incident to everyday activities.

The joints are anatomically and functionally adapted to permit easy motion within a certain range. They are so contained that the cartilage surfaces and the synovial tissues are subjected to frequent injuries of mechanical, toxic, and metabolic nature. In the case of cartilage, such injuries are not well tolerated because of certain inherent biologic characteristics which limit its ability to regenerate. The articular surfaces are prone, therefore, to undergo important regressive changes solely from physiologic aging and the wear and tear of daily use. Such alternations may be greatly accelerated because of deleterious agents, single or repeated trauma, or as the result of deranged mechanics from faulty posture or disturbed locomotion.

Hypothermia results from lowered body temperature resulting from prolonged exposure to reduced temperature conditions. It is well known in the medical profession to apply heat to certain forms of arthritis, especially, osteoarthritis to ease the discomfort caused by osteoarthritis. Garments for keeping the entire body warm are also well known to prevent the onset of hypothermia.

Such garments are useful in their own particular applications, but none of them provide sufficient localized heat to the joints in order to prevent or to reduce the discomfort of osteoarthritis attacks. There is thus a need for a garment which can be worn to reduce the development of osteoarthritic discomfort by preventing the sudden cooling of the joints. There is a further need for a garment which can be worn by a person suffering from osteoarthritis or subjected to low temperature for a period of time that results in hypothermia to provide a retention of heat without adding to the person's discomfort by, for example, overheating the body. The present invention is directed toward filling that need.

SUMMARY OF THE INVENTION

This invention is unique in that it consists of three layers of material which allows it to be used in all types of weather conditions. The three materials increases the temperature of the body parts covered by it well above that of the normal body temperature. Because of the unique construction, there is no "tight-fitting" application to any of the body parts covered by the garments, thereby eliminating the reduction of circulation, which in turn reduces the amount of heat generated by prior devices. The unique nature of the combined materials permits the garment to be made of ultra-light material, which provides medical benefits, physical fit and cosmetic appearance to the garment. The garment can be worn twenty-four hours daily, if necessary, without any adverse effects. The inner lining is made of soft, light material which does not cause any type of skin irritation. The middle layer is made of soft light material, which is specially designed to meet the requirements of the particular body parts. The outer layer is made of light synthetic material which allows the garment to withstand all types of weather conditions, including water immersion.

The garment can withstand all types of weather and the wearer does not lose the benefit of continuous heat generation. The garment meets federal regulation standards, which require that products sold to the public must be able to demonstrate that the products can perform the function as advertised. The garments have been tested on individuals suffering from osteoarthritis of the knee, which is the most common and most difficult part of the body to treat for this particular disease, because of the strength of the knee when in motion. Putting tightly fitting elastic devices on the knee may lend support to ligaments, but it also reduces blood supply to the knee. In addition, there is the problem of "slippage" of other devices, which is also very unsatisfactory. Some manufactures of knee devices have tried to evade the problem by leaving a large opening in the area over the front of the knee (patella area). This also reduces any benefit that such devices render, due to the heat loss from the exposed area. This invention can be used as a complete garment in cold climate or air-conditioned environment for anti-hypothermia effect. The garment can also be used to cover a particular part(s) of the body to produce therapeutic effect (anti-arthritic and certain other joint and muscle ailments). No medications or chemicals are applied to the three layers of fabrics to enhance or modify their natural course of action. The garment can be worn as outer-wear and under-wear.

The garment of this invention is constructed of flexible insulating material adapted to fit around joints or the entire body in order to keep joints and the body warm by the retention of body heat. The garment can be constructed in various forms which will allow a person to select the particular coverage necessary to relieve that person's osteoarthritis pain or hypothermia. Such a garment can be constructed in the form of a jacket, or shirt-type over or undergarment, which provides heat retention to the elbow, shoulder and wrist joints; in the form of trousers or pajama-type over or undergarment which provides heat retention to the hip areas, knees, and ankles; in the form of undergarments which provide heat retention either to the shoulders or the hips; or in the form of stockings which provide heat retention to the knees and/or ankles. The fingers, neck and spinal column also can be treated by the garment contemplated herein.

An object of the present invention is to provide a garment which keeps a person's joints warm by the localized retention of body heat.

A further object of the invention is to provide a three layer garment which keeps the body joints warm, yet allows flexible movement of the joints.

Another object of the invention is to provide a heat retaining garment which can relieve osteoarthritis pain and swelling and can prevent or reduce hypothermia by retaining warmth in a person's body, especially in the joints.

Yet another object of this invention to be specifically enumerated herein is to provide an anti-osteoarthritis and anti-hypothermia garment in accordance with the preceding objects and which will conform to conventional forms of manufacture, be of simple construction and easy to use so as to provide a garment that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE EMBODIMENT ILLUSTRATED

Figure 1:
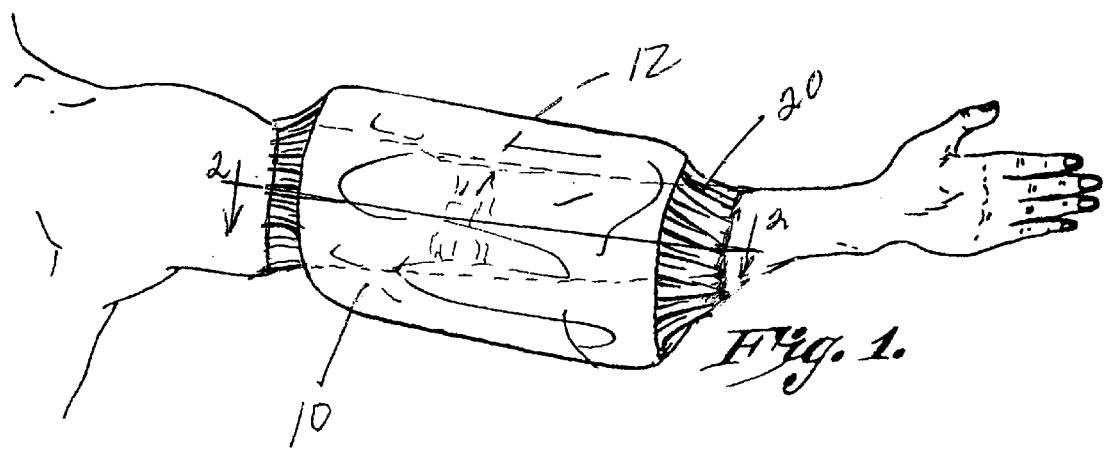
FIG. 1 is a side elevational view of one embodiment of a garment according to the invention which provides coverage for the elbow joint.
Figure 2:
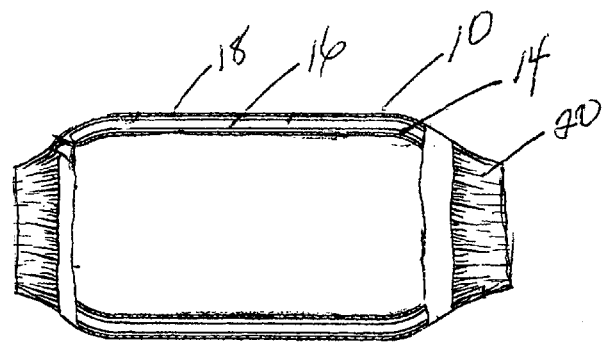
FIG. 2 is a sectional view taken along section line 2—2 in FIG. 1 illustrating the relationship between the garment and elbow.
Figure 3:
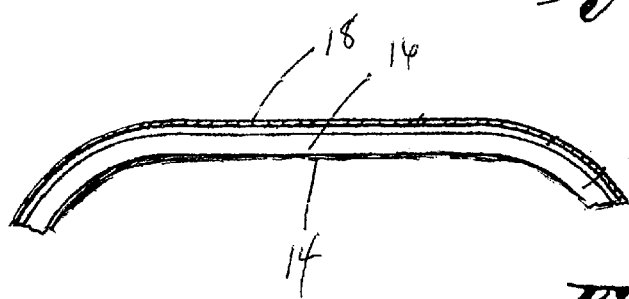
FIG. 3 is an enlarged sectional view showing the three layers of the garment constructed in accordance with the present invention.

Although only one preferred embodiment of the invention is explained in detail, it is to be understood that the invention is not limited in its scope to the details of construction and arrangement of components set forth in the following description or illustrated in the drawings. The invention is capable of other embodiments and of being practiced or carried out in various ways. Also, in describing the preferred embodiment, specific terminology will be resorted to for the sake of clarity. It is to be understood that each specific term includes all technical equivalents which operate in a similar manner to accomplish a similar purpose.

An anti-arthritis, anti-osteoarthritis, and an anti-hypothermia garment 10 for providing coverage to a body joint 12 according to the present invention is illustrated in the drawings. The garment 10 shown encompasses the elbow. However, this invention includes garments to cover all other body joints and the entire body or body parts of the human anatomy or the body or body parts of animals subject to various disorders such as certain forms of arthritis, particularly osteoarthritis.

The dimensions of the garment 10 are largely dependent upon the size and weight of the joints or body of a wearer to keep the body joints of the body warm by retention of body heat. For examples, the elbow garment 10 is formed so that it extends approximately 3 inches to either side of the elbow joint 12.

The material used for the garment used to surround the body joints, parts of the body, or entire body comprises an inner lining 14 constructed of soft, lightweight flexible fabric material which will not cause skin irritation when worn for long periods of time, a middle layer 16 of soft lightweight flexible fabric material and an outer layer 18 of lightweight flexible, water-repellent synthetic material which enables the garment to be used in all weather conditions. The end portions of the garment may be provided with cuffs 20 to snugly fit around body parts adjacent to the body joints. Possible materials that can be used are synthetic plastics, including rubbery type materials, man-made or natural fabrics to provide a garment which is washable, to provide ease of care.

Garments constructed according to the embodiment shown in the drawings can be constructed to be worn as a shirt, jogging garment, or sleeping pajamas, which will serve to alleviate or reduce pain caused by cooling down after exercising, in air conditioned environments, or simply during cool nights. The garment can be in the form of undergarments which are useful to wear under standard clothing in order to alleviate or reduce the pain caused by air conditioning present in, for example, modern offices. Similarly, the garment is useful if only the ankle and knee joints need to be protected or which can be worn under other clothing for the purpose of retaining heat around any body joints, body parts or the entire body.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

I claim:

1. A removable tubular body joint covering for enclosing selected movable joints of humans and animals subject to arthritis, osteoarthritis and hypothermia, the body joint covering comprising multilayered flexible material having two opposite open ends surrounding and containing the joint and retaining body heat in such joints which delays onset of forms of arthritis, relieving the pain thereof and reducing effects of hypothermia, said multilayered flexible material including
- an inner tubular layer of soft, lightweight flexible fabric material that does not irritate the exterior surface of the joints,
- a middle tubular layer of soft, lightweight flexible fabric material having high heat retention characteristics, and
- an outer tubular layer of lightweight flexible synthetic material having water repellent characteristics, wherein said inner tubular layer being retained by the two opposite ends while being spaced from and loosely worn around the selected movable joint to allow freedom of movement of the joint within the body joint covering while retaining heat thereabout.

2. The body joint covering as defined in claim 1, wherein said tubular layer of synthetic material is bonded to said middle tubular layer.

3. The body joint covering as defined in claim 1, wherein said multilayer flexible material surrounds the elbow joints of a wearer and extends above and below the joints a distance of about 3 inches.

* * * * *